2,753,239

PROCESS FOR FIXING DYESTUFFS

Charles Graenacher, Riehen, and Heinrich Bruengger, Basel, Switzerland, assignors to Ciba Limited, Basel, Switzerland, a Swiss firm No Drawing. Application December 18, 1952, Serial No. 326,770

Claims priority, application Switzerland December 21, 1951

13 Claims. (Cl. 8—49)

It is known that sparingly soluble to water insoluble dyestuffs, which contain groups capable of being acylated, can be fixed on substrata by applying them to the substratum in the form of water-soluble acyl derivatives (such, for example as are described in Patents No. 2,120,741 and No. 2,170,262) which contain in the acyl radical groups imparting solubility, and then eliminating the acyl radical imparting solubility by hydrolysis. A large number of such acyl derivatives exhibit a relatively high resistance to mild hydrolyzing agents, so that in order to bring about rapid and complete hydrolysis energetic conditions, for example, a large excess of alkali hydroxide and/or high temperature are necessary. However, these conditions often prove disadvantageous in practice as, on the one hand, they are harmful to certain materials, for example, animal fibers such as wool or silk and also acetyl-cellulose, and, on the other, they are not free from danger to the workers carrying out the process. Moreover, the fixation is quite loose in the case of a substratum of vegetable fibers or regenerated cellulose, since the acyl derivatives have no affinity for cellulose, and the acyl derivatives are therefore easily dissolved away from the substratum unless the hydrolysis takes place extraordinarily rapidly. In order to inhibit dissolution of the dyestuff from the substratum, it has been proposed to add to the hydrolysis bath substances having a salting-out action, for example, sodium chloride in a high concentration, for example, of 50 to 200 grams per liter, or substances, such as alkaline earth metal salts, which yield insoluble precipitates with the acyl derivatives, or to carry out the hydrolysis with hydrolyzing agents in the form of vapour such as ammonia gas. When alkaline earth metal salts are used a separate operation, such, for example, as acidification with dilute hot hydrochloric acid is necessary after the hydrolysis in order to remove sparingly soluble alkaline earth metal salts still present, for example, an alkaline earth metal carbonate. Hydrolysis with agents in the form of vapour, for example, ammonia gas necessitates additional apparatus such as gas chambers, and has the disadvantage that odours can hardly be avoided. Although these expedients generally give good results they have the disadvantage that the hydrolysis operation is considerably complicated and commercially inconvenient.

The resistance to hydrolyzing agents varies depending on the constitution of the acyl derivative, and in this connection the acyl radical as well as the remaining radical of the dyestuff is important. Especially resistant to hydrolyzing agents are in general those acyl derivatives which contain as the acyl radical a benzoyl mono- or disulfonic acid radical (see Patents No. 2,120,741 and No. 2,170,262). However, even in the case of the products which are generally considerably more easily hydrolyzed and contain as the acyl radical radicals of the formula HO₃S—CH—CO—
    |
    Halogen or those of the formula

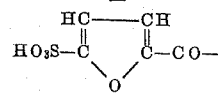

(see Patents No. 2,595,571 and No. 2,653,927), it is desirable in some cases to accelerate the hydrolysis.

The process of this invention enables dyestuffs of the aforesaid kind to be fixed rapidly and practically completely in a very simple manner. In the process of the invention a water-soluble acyl derivative of a sparingly soluble to insoluble dyestuff, which contains groups imparting solubility in the acyl radical, is hydrolyzed on the substratum in an alkaline medium in the presence of a water-soluble peroxide compound.

The acyl derivatives can be applied to the substrata in known manner. As substrata there come into consideration above all textile fibers, for example, those of animal origin such as wool or silk, but especially cellulose-containing fibers such as cotton, linen, and artificial silk or staple fibers of regenerated cellulose, and also synthetic fibers, for example, those composed of superpolyamides or superpolyurethanes. Furthermore, there may be used fibers of cellulose esters such as acetyl-cellulose artificial silk. Instead of textile fibers, shaped structures of other kinds, for example, foils, may be used as substrata.

The acyl derivatives of the azo-dyestuffs can be applied to foils and other structures of sheet form, especially fabrics, in a very simple manner and advantageously by methods in themselves known, for example, by foularding, or by printing such structures with the usual printing pastes which contain in addition to the dyestuff derivative an ordinary thickening agent, for example, starch-tragacanth thickening, and an assistant such, for example, as thiodiglycol and/or urea or the like, and then a short steaming to improve the penetration of the printed material.

The dyestuffs, whose acyl derivatives are used in the present process, may be of any desired constitution, provided that they are sparingly soluble to insoluble in water and therefore are preferably free from carboxylic acid and sulfonic acid groups imparting solubility, and that they contain at least one group capable of acylation such as a hydroxyl group or a primary or secondary amino group.

There may be mentioned more especially azo-dyestuffs which are obtainable by coupling a diazo compound free from groups imparting solubility with a hydroxyaryl-ortho-carboxylic acid arylide also free from groups imparting solubility, and which correspond to the formula (1)

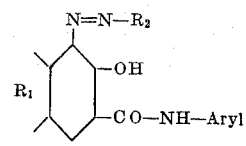

in which R₁ represents a ring-forming residue fused on to the benzene ring at the positions indicated by the valency bonds, and R₂ represents the radical of a diazo-component, advantageously one which is suitable for the production of ice colours. As coupling components there may be used, for example, compounds of the formulae (2) 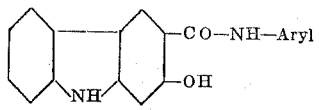

and (3) 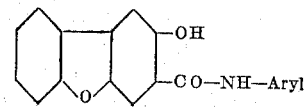

and especially those of the formula (4)

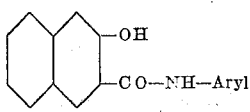

The aryl radical may be, for example, a naphthalene radical or a radical of the benzene series such, for example, as a phenyl, 2-methyl-phenyl or 2-methoxy-phenyl group.

As already indicated the acyl radical in the acyl derivative of the dyestuff may, for example, be one which is bound to the dyestuff by the —CO— group in the carboxylic acid group, and which is derived from chloro- or brom-acetic acid sulfonic acid, or from furane- or thiophene-2-carboxylic acid-5-sulfonic acid or advantageously from an acid of the formula

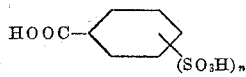

in which $n$ equals 1 or 2. As acyl derivatives of the dyestuffs of the general Formula 1, there are advantageously used, for example, those which correspond to the formula

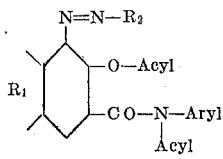

and in which each acyl group contains a sulfonic acid group.

As water-soluble peroxides for use in the present invention there come into consideration substances which are capable of providing hydrogen peroxide in aqueous alkaline media, thus, for example, alkali peroxides such as sodium peroxide, potassium peroxide, alkali percarbonates, alkali perborates and also hydrogen peroxide itself, and also mixtures from which peroxides are produced, that is to say, for example, baths in which peroxides are produced or formed, for example, by electrolysis.

The peroxides are active even at very low concentrations. There are advantageously used treatment baths which contain about one-tenth to one part of peroxide in 100 parts by volume, and, if desired, the peroxide consumed during the hydrolysis may be replaced.

An alkaline reaction may be imparted to the dyebath by the usual additions capable of producing an alkaline reaction, for example, an alkali acetate, an alkali orthophosphate, an alkali carbonate or bicarbonate, ammonia, a water-soluble amine such as ethanolamine, or an alkali hydroxide. Even the use of an alkali hydroxide in the present process is not harmful in the case of cellulose-containing materials, since very small concentrations, for example, less than one part of hydroxide in 100 parts of hydrolysis solution, are used.

Furthermore, it is desirable to add to the hydrolysis bath a relatively small quantity of a substance having a salting-out action, for example, sodium chloride, sodium sulfate or sodium carbonate, the latter also acting as an alkali. 2–5 parts of the substance having a salting-out action per 100 parts of solution are usually sufficient, so that the known disadvantages resulting from the use of highly concentrated salt solutions in the hydrolysis processes hereinbefore referred to are avoided in the present process.

The peroxides are in themselves not very stable in these solutions, so that the hydrolysis is advantageously carried out either in a freshly prepared bath or the bath is stabilized. This is advantageously brought about by known products, for example, by the addition of a vegetable mucilage such as tragacanth or a starch paste. When such a substance is present in a printing composition, which is used for applying the dyestuff to the substratum, the hydrolysis solution is thereby stabilized at the outset of the hydrolysis process.

In the present process fixation of the dyestuff on the substratum takes place in a very short time at room temperature, for example, within 1 to 2 minutes it is practically complete, and no appreciable amount of dyestuff passes into solution or on to the parts free from dyestuff, that is to say, unprinted parts.

It will be apparent that the process is very valuable as a continuous process, which is of special importance in that it can be carried out in conjunction with a printing process which is also continuous. In some cases it is of advantage to decrease still further the duration of the treatment in the development bath and to complete the hydrolysis of the acylated dyestuff on the fabric by a short passage through the air lasting from 1 to 5 minutes.

Prints so produced can be after-treated in known manner. In order to remove starch, treatment with an enzyme preparation is of advantage. As a rule it is desirable to treat the material in a hot, for example, boiling, soap solution in order to produce a full, pure and bright tint.

The following examples illustrate the invention, the parts and percentages being by weight unless otherwise stated, and the relationship of parts by weight to parts by volume being the same as that of the kilogram to the liter:

*Example 1*

A dyestuff paste is prepared having the following composition 78 parts of the reaction product of 2 mols of benzoic acid chloride-3-sulfonic acid with 1 mol of the azo dyestuff from diazotized 2:5-dichloro-1-aminobenzene and 1-(2'-hydroxy-3'-naphthoylamino)-2-methoxybenzene (the resulting dyestuff derivative contains twice the acyl radical of the formula

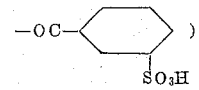

322 parts of water,
100 parts of phiodiglycol,
500 parts of neutral starch-tragacanth thickening
_____
1000 parts A cotton fabric is printed with the above printing paste. It is then dried and steamed for 5–10 minutes in a Mather-Platt apparatus. The print is then treated at room temperature for 1–2 minutes in a bath which contains, in 1000 parts by volume of water, 50 parts of anhydrous sodium carbonate, 4 parts of sodium hydroxide and 2 parts of sodium perborate. The print is then rinsed in the cold, treated with an enzyme preparation and finally soaped at the boil for 10–15 minutes. There is obtained a strong bright scarlet red print.

Rapid and complete development of the print is brought about also with the following developing baths, which contain in 1000 parts by volume of water the following ingredients:

| | | | | |
|---|---|---|---|---|
| 1 | | 20 parts of sodium carbonate. | 4 parts of sodium hydroxide. | 2 parts of sodium perborate. |
| 2 | 30 parts of sodium chloride. | | do | Do. |
| 3 | do | | do | 2 parts sodium percarbonate. |
| 4 | do | | do | 2 parts of sodium peroxide. |
| 5 | do | 10 parts of sodium carbonate. | | 8 parts of sodium peroxide. |
| 6 | do | | 4 parts of sodium hydroxide. | 2 parts of hydrogen peroxide. |

Rapid and complete development is also brought about when these developing baths are used for treating prints produced with the reaction products of 2 mols of benzoyl chloride-3-sulfonic acid and 1 mol of the following monoazo-dyestuff:

| | Diazo-component | Coupling-component | Dyeing |
|---|---|---|---|
| 1 | 3-chloro-1-aminobenzene | 1-(2'-hydroxy-3'-naphthoyl-amino)-2-methoxybenzene. | orange. |
| 2 | 4-chloro-2-methyl-1-aminobenzene. | 1-(2'-hydroxy-3'-naphthoyl-amino)-2-methyl-4-chlorobenzene. | red. |
| 3 | 5-trifluoromethyl-2-chloro-1-aminobenzene. | 1-(2'-hydroxy-3'-naphthoyl-amino)-benzene. | orange. |
| 4 | 4-nitro-2-methyl-1-aminobenzene. | 1-(2'-hydroxy-3'-naphthoyl-amino)-2-methylbenzene. | ruby. |
| 5 | 5-chloro-2-methyl-1-aminobenzene. | 1-(2'-hydroxy-3'-naphthoyl-amino)-2-methylbenzene. | red. |

If the peroxide compounds are omitted from the above developing baths, the after-treating baths (the developing bath and especially the soaping bath) are strongly coloured owing to the incomplete fixation of the dyestuff or the incomplete hydrolysis of the dyestuff derivative used, and considerably weaker prints are produced.

*Example 2*

A printing paste is prepared having the following composition:
42 parts of the reaction product of 2 mols of benzoyl chloride-3-sulfonic acid and 1 mol of the dyestuff from diazotized 4-benzoylamino-2:5-diethoxy-1-aminobenzene and (2'-hydroxy-3'-naphthoylamino)-benzene (pigment content of the acyl derivative = 46.8 per cent.),
358 parts of water,
100 parts of thiodiglycol,
500 parts of starch-tragacanth thickening 1000 parts The printing paste is printed on a cotton fabric. It is then dried and steamed for 5–10 minutes in a Mather-Platt apparatus. The print is then passed in the course of 30 seconds to one minute at room temperature through a developing bath which contains, in 1000 parts by volume of water, 30 parts of sodium chloride, 4 parts of sodium hydroxide, 2 parts of sodium perborate and 1 part of neutral starch-tragacanth thickening. After a passage through the air of 1–3 minutes the print is rinsed with cold water, treated with an enzyme preparation, and finally soaped at the boil for 10–15 minutes. There is obtained a powerful fast blue print.

*Example 3*

A printing paste is prepared having the following composition:

68 parts of the acyl derivatives obtained by diacylating the dyestuff from diazotized 3-chloro-1-aminobenzene and 1-(2'-hydroxy-3'-naphthoylamino)-2-methoxy-5-chlorobenzene with an acylating agent obtained by reacting para-toluene sulfonic acid chloride with furane-2-carboxylic acid-5-sulfonic acid in pyridine (pigment content of the acyl derivative=47.3 per cent.)
332 parts of water
100 parts of thiodiglycol
500 parts of neutral starch-tragacanth thickening 1000 parts A cotton fabric printed with the above paste is dried and steamed for 5–10 minutes in a Mather-Platt apparatus. The print is then passed for 30 seconds to 1 minute at room temperature through a developing bath which contains, in 1000 parts by volume of water, 10 parts of ammonia and 5 parts of sodium perborate. The material is then immediately rinsed in the cold, after-treated with an enzyme preparation, and finally soaped at the boil for 10–15 minutes. There is obtained a strong print having a bright scarlet red tint.

If the print is developed for the same period, namely 30 seconds to 1 minute, in a bath which contains only the aforesaid quantity of ammonia, without the sodium perborate, there is obtained a weaker tint.

*Example 4*

A printing paste is prepared having the following composition:

60 parts of the product obtained by acylating the dyestuff from diazotized α-naphthylamine and β-naphthol with an acylating agent obtained by the reaction of para-toluene sulfonic acid chloride with benzoic acid-3:5-disulfonic acid in pyridine
340 parts of water
100 parts of thiodiglycol
500 parts of neutral starch tragacanth thickening 1000 parts A cotton fabric treated with the above printing paste is dried and steamed for 5–10 minutes in a Mather-Platt apparatus. The print is then passed for 2 minutes at room temperature through a developing bath which contains, in 1000 parts by volume of water, 30 parts of sodium chloride, 4 parts of sodium hydroxide and 2 parts of sodium perborate. It is then immediately rinsed in the cold, after-treated with an enzyme preparation, and finally soaped at the boil for 10–15 minutes. There is obtained a strong print having a Bordeaux tint.

If the print is developed for the same time in a bath which contains only the aforesaid quantities of sodium chloride and sodium hydroxide, without the sodium perborate, there is obtained a distinctly weaker tint.

*Example 5*

A printing paste is prepared having the following composition:

80 parts of the reaction product of 2 mols of benzoic acid chloride-3-sulfonic acid and 1 mol of the azo-dyestuff from diazotized 2:5-dichloro-1-aminobenzene and 1-(2'-hydroxy-3'-naphthoylamino)-2-methoxybenzene in pyridine
170 parts of water
150 parts of thiodiglycol
100 parts of urea
500 parts of neutral starch-tragacanth thickening 1000 parts A fabric of staple fibers of regenerated cellulose is printed with the above printing paste. It is then dried and steamed for 5–10 minutes in a Mather-Platt apparatus. The print is then treated at room temperature for 1–2 minutes in a bath which contains, in 1000 parts by volume of water, 30 parts of sodium chloride, 4 parts of sodium hydroxide and 2 parts of sodium perborate. The print is then rinsed in the cold, treated with an enzyme preparation, and finally soaped at the boil for 10–15 minutes. There is obtained a strong scarlet print.

If the print is treated for the same period of 1–2 minutes in a bath which contains only the aforesaid quantities of sodium chloride and sodium hydroxide, and no sodium perborate, there is obtained only a weak scarlet print.

*Example 6*

A printing paste is prepared having the following composition:

56 parts of the reaction product of 2 mols of benzoic acid chloride-3-sulfonic acid and 1 mol of the azo dyestuff from diazotized 4-methoxy-2-nitro-1-aminobenzene and 1-(2'-hydroxy-3'-naphthoyl-amino)-2-methoxybenzene in pyridine 194 parts of water
250 parts of urea
500 parts of neutral starch-tragacanth thickening
_____
1000 parts The above printing paste is printed on a viscose artificial silk fabric. It is then dried and steamed for 10–15 minutes in a Mather-Platt apparatus. The print is then treated at room temperature for 1–2 minutes in a bath which contains, in 1000 parts by volume of water 30 parts of sodium chloride, 4 parts of sodium hydroxide and 2 parts of sodium perborate. The print is then rinsed in the cold, treated with an enzyme preparation, and finally soaped for 10–15 minutes at 80° C. There is obtained a strong print having a Bordeaux tint.

If the print is developed in a bath which contains only the aforesaid quantities of sodium chloride and sodium hydroxide and no sodium perborate, there is obtained a weak Bordeaux print.

What is claimed is:

1. A process for fixing monoazo dyestuffs free from water solubilizing groups on a substratum on which the dyestuffs are present in the form of water-soluble acyl derivatives containing in the acyl radical a water solubilizing group which is derived from one of the acids selected from the group consisting of a sulfothiophene carboxylic acid, a sulfofurane carboxylic acid and a sulfobenzene carboxylic acid, which comprises hydrolising the water-soluble derivatives on the said substratum in an alkaline medium in the presence of a water-soluble peroxide compound.

2. A process for fixing dyestuffs free from water solubilizing groups on cellulosic textile material on which the dyestuffs are present in the form of water-soluble acyl derivatives of the formula

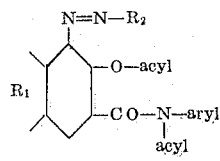

wherein $R_1$ represents a member of the group consisting of the radicals

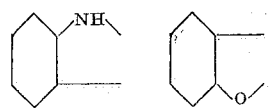

and

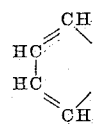

and $R_2$ represents the radical of a diazo-component free from water solubilizing groups, the acyl radicals being selected from the group consisting of the radicals

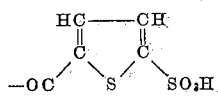 and 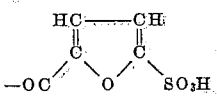

and

wherein $n$ represents a whole number up to 2, which process comprises hydrolising the water-soluble derivatives on the said cellulosic textile material in an alkaline medium in the presence of a water-soluble peroxide compound.

3. A process for fixing dyestuffs free from water solubilizing groups on a cellulosic fabric on which there has been printed a water-soluble acyl derivative of the formula

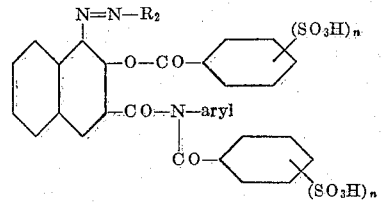

wherein $n$ represents a whole number up to 2 and $R_2$ the radical of a diazo component free from water solubilizing groups, which process comprises hydrolyzing the said acyl derivative on the said fabric in an alkaline medium in the presence of a water-soluble peroxide compound.

4. A process for fixing dyestuffs free from water solubilizing groups on a cellulosic fabric on which there has been printed a water-soluble acyl derivative of the formula

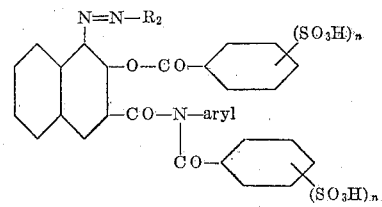

wherein $n$ represents a whole number up to 2 and $R_2$ the radical of a diazo component free from water solubilizing groups, which process comprises hydrolyzing the said acyl derivative on the said fabric in an alkaline medium containing less than 1 per cent of sodium hydroxide and at least 0.1 per cent of a water-soluble peroxide compound.

5. A process for fixing dyestuffs free from water solubilizing groups on a cellulosic fabric on which there has been printed a water-soluble acyl derivative of the formula

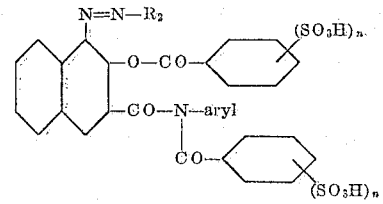

wherein $n$ represents a whole number up to 2 and $R_2$ the radical of a diazo component free from water solubilizing groups, which process comprises hydrolyzing the said acyl derivative on the said fabric in an alkaline medium containing sodium carbonate and at least 0.1 per cent of a water-soluble peroxide compound.

6. A process for fixing dyestuffs free from water solubilizing groups on a cellulosic fabric on which there has been printed a water-soluble acyl derivative of the formula

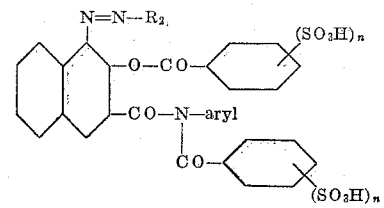

wherein $n$ represents a whole number up to 2 and $R_2$ the radical of a diazo component free from water solubilizing groups, which process comprises hydrolyzing the said acyl derivative on the said fabric in an alkaline medium containing ammonia and at least 0.1 per cent of a water-soluble peroxide compound.

7. A process according to claim 4, wherein the water-soluble peroxide compound is sodium perborate.

8. A process according to claim 5, wherein the water-soluble peroxide compound is sodium perborate.

9. A process according to claim 6, wherein the water-soluble peroxide compound is sodium perborate.

10. A process according to claim 4, wherein the water-soluble peroxide compound is sodium percarbonate.

11. A process for fixing dyestuffs free from water solubilizing groups on a cellulosic fabric on which there has been printed a water-soluble acyl derivative of the formula

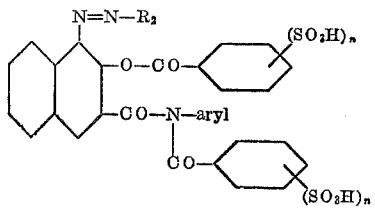

wherein $n$ represents a whole number up to 2 and $R_2$ the radical of a diazo component free from water solubilizing groups, which process comprises hydrolyzing the said acyl derivative on the said fabric in an alkaline medium containing less than 1 per cent of sodium hydroxide, at least 0.1 per cent of sodium perborate and tragacanth.

12. In a process for fixing monoazo dyestuffs free from water solubilizing groups on a substratum on which the dyestuffs have been printed in the form of their water-soluble acyl derivatives and in which process the fixing is carried out by hydrolysis in an alkaline medium, the improvement which comprises performing the hydrolysis in the presence of a water-soluble peroxide compound.

13. In a process for fixing monoazo dyestuffs free from water solubilizing groups on a substratum on which the dyestuffs have been printed in the form of their water-soluble acyl derivatives and in which process the fixing is carried out by hydrolysis in an alkaline medium, the improvement which comprises performing the hydrolysis in the presence of sodium perborate.

References Cited in the file of this patent
UNITED STATES PATENTS

| | | |
|---|---|---|
| 2,187,453 | Graenacher | Jan. 16, 1940 |
| 2,199,048 | Graenacher | Apr. 30, 1940 |
| 2,204,933 | Graenacher | June 18, 1940 |